United States Patent
Winkler

(10) Patent No.: US 11,884,421 B2
(45) Date of Patent: Jan. 30, 2024

(54) HIGH ALTITUDE FIXED PLATFORM LAUNCH OF UAVS

(71) Applicant: Thunderbolt Software LLC, Tuckerton, NJ (US)

(72) Inventor: Andrew Winkler, Cherry Hill, NJ (US)

(73) Assignee: Thunderbolt Software LLC, Tuckerton, NJ (US)

( * ) Notice: Subject to any disclaimer, the term of this patent is extended or adjusted under 35 U.S.C. 154(b) by 1 day.

(21) Appl. No.: 17/875,612

(22) Filed: Jul. 28, 2022

(65) Prior Publication Data

US 2023/0032896 A1   Feb. 2, 2023

Related U.S. Application Data

(60) Provisional application No. 63/226,259, filed on Jul. 28, 2021.

(51) Int. Cl.
| | |
|---|---|
| *B64F 1/04* | (2006.01) |
| *B64C 39/02* | (2023.01) |
| *B64U 70/00* | (2023.01) |

(52) U.S. Cl.
CPC .............. *B64F 1/04* (2013.01); *B64C 39/024* (2013.01); *B64U 70/00* (2023.01)

(58) Field of Classification Search
CPC .................................................. B64U 70/00
See application file for complete search history.

(56) References Cited

U.S. PATENT DOCUMENTS

| | | | |
|---|---|---|---|
| 4,678,141 A * | 7/1987 | Sarrantonio | B64C 37/02 244/63 |
| 2005/0017129 A1* | 1/2005 | McDonnell | B64F 1/10 244/110 G |
| 2017/0036762 A1* | 2/2017 | Gamble | B64U 10/25 |
| 2017/0274997 A1* | 9/2017 | von Flotow | B64U 70/30 |
| 2019/0033889 A1* | 1/2019 | von Flotow | G05D 1/104 |
| 2019/0071176 A1* | 3/2019 | von Flotow | B64C 39/024 |
| 2020/0279495 A1* | 9/2020 | von Flotow | B64F 1/0295 |

\* cited by examiner

*Primary Examiner* — Justin M Benedik
(74) *Attorney, Agent, or Firm* — Suiter Swantz pc llo

(57) ABSTRACT

A UAV launch system including a launch rack mounted at altitude, and housing one or more UAVs, and a ground station. The ground station may activate the UAVs for a high-altitude launch. In a further aspect, the UAVs are configured for a stationary, high-altitude launch, without low altitude launch features. Launching a UAV from a high-altitude (greater than about 30 meters or 100 feet) fixed location like an Aerostat or tall building allows the designer to eliminate much of the functionality required for launching the UAV from low altitude as well as ignore the aerodynamics required to support launch (e.g. near-stall) flight conditions.

20 Claims, 2 Drawing Sheets

HIGH ALTITUDE FIXED PLATFORM LAUNCH OF UAVS

PRIORITY

The present application claims the benefit under 35 U.S.C. § 119(e) of U.S. Provisional App. No. 63/226,259 (filed Jul. 28, 2021), which is incorporated herein by reference.

FIELD OF THE INVENTION

Embodiments of the inventive concepts disclosed herein are directed generally toward unmanned aerial vehicles and more specifically to launching unmanned aerial vehicles.

BACKGROUND

Unmanned aerial vehicles (UAVs) are designed with compromises to balance aerodynamic and power performance across the entire flight profile, from launch to landing. This requires tradeoffs between different performance characteristics such as top speed, endurance, and altitude. To achieve high performance on one of these areas, the UAV designer has to consider things like larger platform, or (especially in the case of top speed) bigger powerplant. High speed UAVs are critical for applications where time to intercept is critical.

SUMMARY

In one aspect, embodiments of the inventive concepts disclosed herein are directed to a UAV launch system including a launch rack mounted at altitude and housing one or more UAVs, and a ground station. The ground station may activate the UAVs for a high-altitude launch. In a further aspect, the UAVs are configured for a stationary, high-altitude launch, without low altitude launch features.

Launching a UAV from a high-altitude (greater than about 30 meters or 100 feet) fixed location like an Aerostat or tall building allows the designer to eliminate much of the functionality required for launching the UAV from low altitude as well as ignore the aerodynamics required to support launch (e.g., near-stall) flight conditions.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
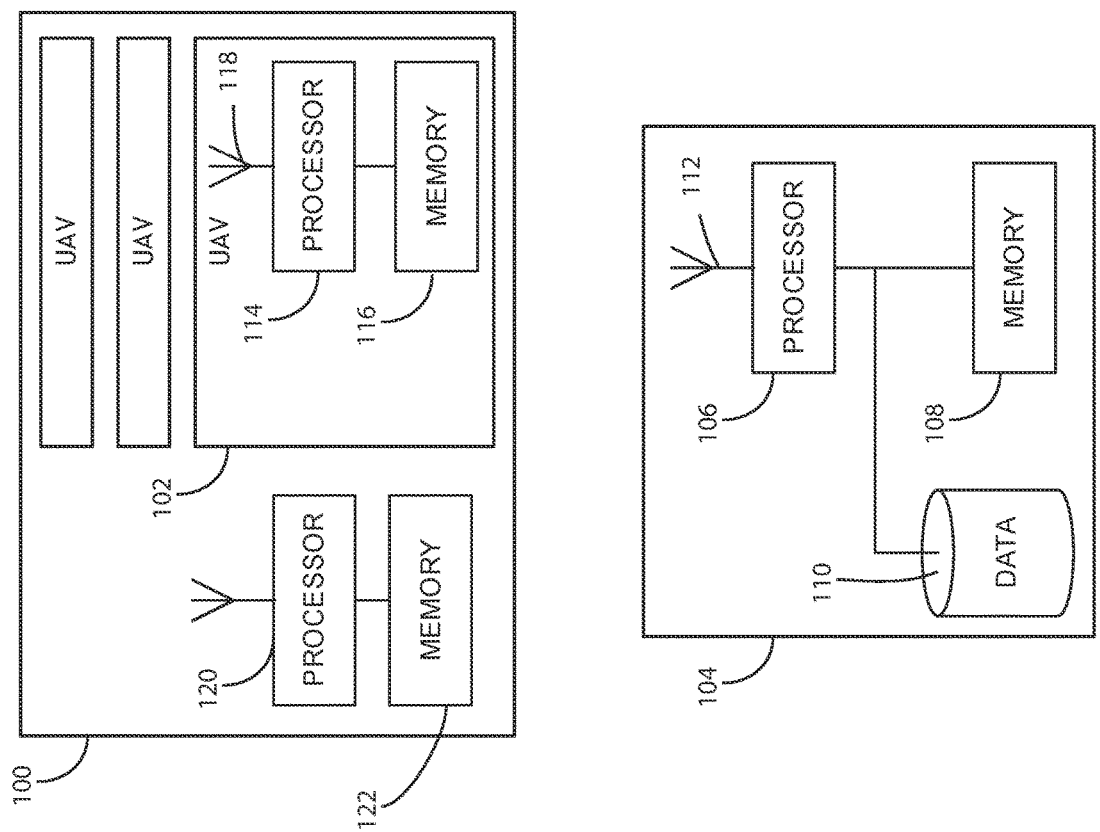
FIG. 1 shows a block diagram of a system for implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a UAV launch system including a launch rack mounted at altitude, and housing one or more UAVs, and a ground station. The ground station may activate the UAVs for a high-altitude launch. In a further aspect, the UAVs are configured for a stationary, high-altitude launch, without low altitude launch features.

Referring to FIG. 1, a block diagram of a system for implementing an exemplary embodiment is shown. The system includes a UAV rack 100 configured to be mounted at altitude and house one or more altitude launchable UAVs 102. Each altitude launchable UAV 102 may include a processor 114 and memory 116 in data communication with the processor 114 for storing processor executable code.

Each UAV processor 114 receives signals via an antenna 118 from a ground station 104 and applies control signals to motors or control surface actuators to steer and control the altitude launchable UAV 102.

The altitude launchable UAVs 102 may comprise light weight Group 1 or Group 2 UAVs (approximately 25 kilograms or 55 pounds). Because the altitude launchable UAVs 102 are disposed in a high-altitude UAV rack 100 prior to launch, the altitude launchable UAVs 102 may be configured to launch with an initial drop of some know distance, or a gravity assisted launch. Motors and control surfaces of the altitude launchable UAVs 102 may be selected or designed according to the gravity assisted launch (e.g., less powerful motors, smaller control surfaces, etc.). Furthermore, each altitude launchable UAV 102 may accommodate a larger/heavier payload which may facilitate the gravity assisted launch. In at least one embodiment, the altitude launchable UAVs 102 may include high explosive or armor pricing warheads for additional effects. In at least one embodiment, a ground station may provide intercept targets and intercept targeting information to an armed altitude launchable UAV 102 that may then autonomously intercept a target.

In at least one embodiment, the UAV rack 100 may be configured for attachment to an aerostat (e.g., a lighter-than-air platform) to maintain the UAV rack at a known launch altitude. Alternatively, the UAV rack 100 may be disposed on a building or other tall structure where the UAV rack 100 can be disposed at a known altitude. In at least one embodiment, the UAV rack 100 may include a processor 120 and memory 122 connected to the processor 120 for storing processor executable code. The UAV rack processor 120 may receive signals from a ground station 104 to implement launch procedures. For example, the UAV rack processor 120 may open doors on the UAV rack 100 prior to launch. Alternatively, or in addition, the UAV rack processor 120 may actuate a linear actuator corresponding to one of the altitude launchable UAVs 102, pushing the altitude launchable UAVs 102 out of the rack to facilitate a gravity assisted launch. In at least one embodiment, the UAV rack 100 may include a wireless charging system disposed to interact with a corresponding wireless changing system in each of the altitude launchable UAVs 102 to maintain maximum power readiness in each of the altitude launchable UAVs 102.

In at least one embodiment, the UAV rack processor 120 may be in data communication with one or more sensors on or proximal to the UAV rack 100 (e.g., weather sensors, optical sensors, etc.) At launch, the UAV rack processor 120 may communicate such sensor data to the altitude launchable UAVs 102 or the ground station 104 to facilitate the gravity assisted launch. For example, each UAV processor 114 may be configured to execute alternative launch procedures according to different weather conditions. Such alternative launch procedures may be defined by a checklist, one or more functions relating the weather conditions to control settings, a neural network trained to receive weather condition data and output control settings, etc.

The system includes a ground station 104 having a processor 106, memory 108 connected to the processor 106 for storing processor executable code, and a an antenna 112 or radio (including a software defined radio defined by the processor 106) connected to the processor 106 for wireless communication with the altitude launchable UAVs 102 and potentially with the UAV rack 100. The ground station processor 106 sends signals to actuate motors and/or control surfaces in one of the altitude launchable UAVs 102 to execute a gravity assisted launch. Alternatively, the ground station processor 106 may transmit a launch signal to one or more altitude launchable UAVs 102 that receive the launch signal and automatically execute a predefined launch procedure. When the predefined launch procedure is complete, the altitude launchable UAV 102 may then enter a loitering procedure and await control signals from the ground station 104.

In at least one embodiment, the ground station 104 may include a data storage element 110 in data communication with the ground station processor 106. The data storage element 110 may store sets of gravity assisted launch procedures that may be transmitted to the altitude launchable UAVs 102 according to environmental conditions, mission parameters, etc. Furthermore, the data storage element 110 may store predefined sets of mission parameters that may be selected and transmitted to the altitude launchable UAVs 102.

Figure 2:
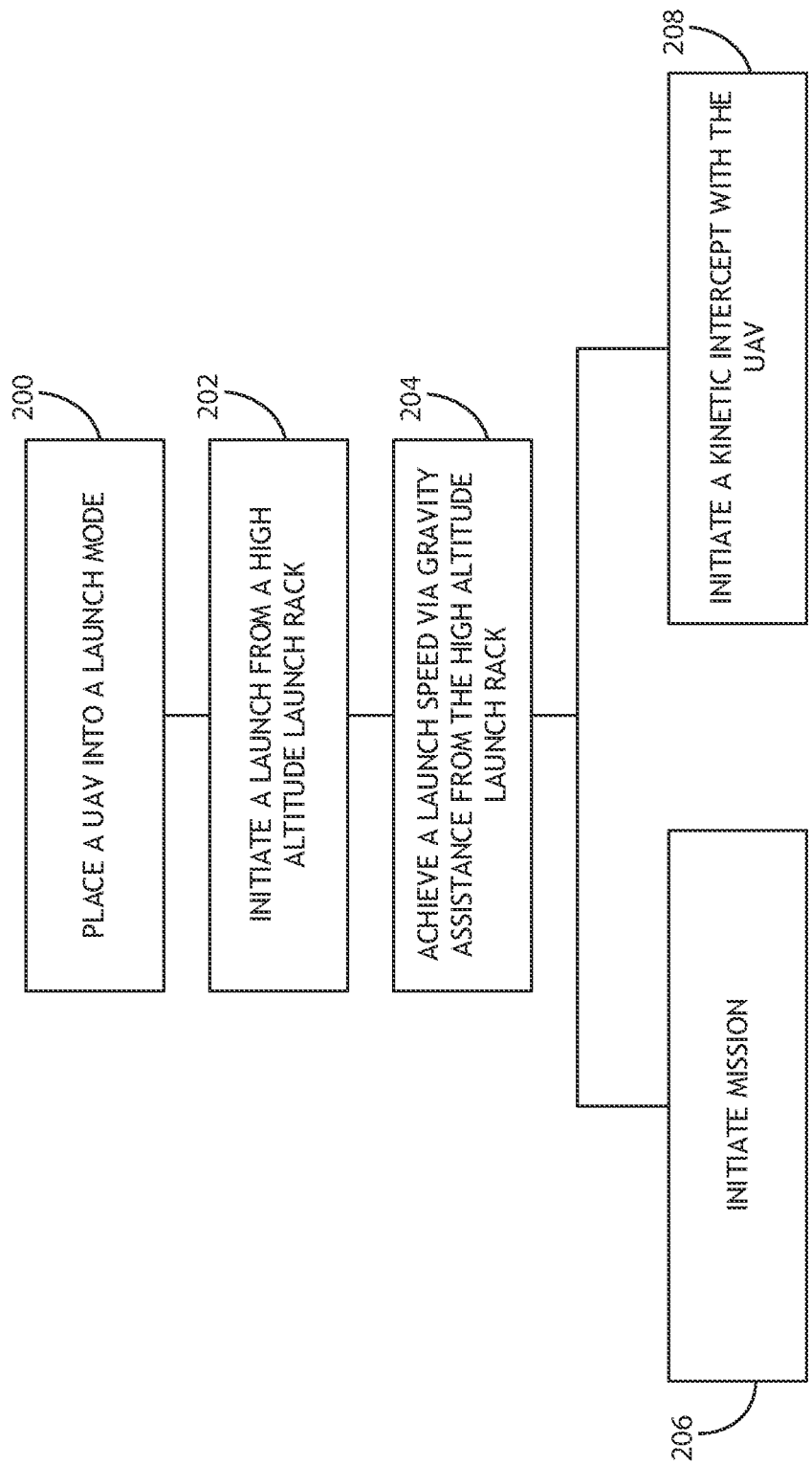
FIG. 2 shows a flowchart of a method according to an exemplary embodiment.

Referring to FIG. 2, a flowchart of a method according to an exemplary embodiment is shown. Where a UAV rack is mounted at a launch altitude (e.g., thirty meters or one hundred feet), a ground station or UAV rack may place 200 a corresponding altitude launchable UAV into a launch mode and initiate 202 a launch sequence. The launch sequence may include ejecting the altitude launchable UAV from the UAV rack and allow gravity to accelerate the altitude launchable UAV. Control surface and motors may be actuated to maintain the altitude launchable UAV in an orientation to accelerate with gravity until the altitude launchable UAV achieves 204 a launch speed (e.g., 250 knots).

In at least one embodiment, after the altitude launchable UAV achieves 204 launch speed, the altitude launchable UAV may execute a loitering procedure to await additional control signals. Alternatively, or in addition, the altitude launchable UAV may receive mission parameters from the ground station and initiate 106 a mission. The ground station may transmit mission parameters wherein the altitude launchable UAV then autonomously executes the mission, or the ground station may directly control some or all of the features of the altitude launchable UAV, or some hybrid autonomous operation.

In at least one embodiment, the altitude launchable UAV may be configured to initiate 208 a kinetic interception. The altitude launchable UAV may receive a signal corresponding to a kinetic intercept mission and a target. The altitude launchable UAV then autonomously intercepts the target Embodiments of the present disclosure describe a UAV launching system from a fixed altitude platform such as an aerostat for a gravity assisted launch. The altitude launched UAVs are specifically configured and aerodynamically designed to launch from a fixed, high-altitude without needing the power and control surfaces to execute a ground launch and climb.

Launching from altitude allows leveraging a significant amount of potential energy and eliminates need for launching devices such as catapults or pneumatic launch tubes. Upon command from a ground station, the UAVs can be launched from the rack to perform missions designated by the ground station. Once dropped the UAVs powerplant can engage and rapidly achieve top speed. The UAVs can then be used to provide rapid ISR (information, surveillance, and reconnaissance operations) or take advantage of the kinetic energy to achieve different effects including kinetic intercept of other UAVs or kinetic bombardment.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A UAV launch system comprising:
  a UAV rack configured to house one or more altitude launchable UAVs;
  one or more altitude launchable UAVs configured for storage in the UAV rack; and
  a ground station including an antenna and at least one processor in data communication with the antenna and a memory storing processor executable code for configuring the at least one processor to:
    transmit a signal to place one of the altitude launchable UAVs in a launch mode, the launch mode defined by a drop of a predetermined distanced corresponding to an altitude of the UAV rack; and
    transmit a signal to execute a launch procedure to at least one of the altitude launchable UAVs.

2. The UAV launch system of claim 1, wherein each of the altitude launchable UAVs is configured to launch via a gravity assisted drop.

3. The UAV launch system of claim 1, wherein the UAV rack comprises a processor configured:
  receive the signal to execute the launch procedure; and
  eject the at least one altitude launchable UAV.

4. The UAV launch system of claim 1, wherein:
  the UAV rack comprises a wireless power system disposed to charge the one or more altitude launchable UAVs; and
  each of the one or more altitude launchable UAVs comprises a wireless power system disposed to engage the wireless power system of the UAV rack.

5. The UAV launch system of claim 1, wherein:
  each of the altitude launchable UAVs is configured to execute the launch procedure and then execute a loiter procedure; and
  the at least one processor is further configured to transmit mission parameters to the at least one altitude launchable UAVs.

6. The UAV launch system of claim 5, wherein the mission parameters define a kinetic intercept mission.

7. The UAV launch system of claim 1, wherein:
  the at least one processor is further configured to transmit a kinetic intercept mission to the at least one altitude launchable UAVs; and
  the at least one altitude launchable UAVs are configured to execute the kinetic intercept mission during a gravity assisted phase of the launch procedure.

8. A Method comprising:
  transmitting a signal to place one of one or more altitude launchable UAVs in a launch mode, the launch mode defined by a drop of a predetermined distanced corresponding to an altitude of a UAV rack; and
  transmitting a signal to execute a launch procedure to at least one of the altitude launchable UAVs,
  wherein:
    the one or more altitude launchable UAVs are disposed in the UAV rack; and
    the UAV rack is disposed at least thirty meters above a launch area.

9. The Method of claim 8, wherein each of the altitude launchable UAVs is configured to launch via a gravity assisted drop.

10. The Method of claim 8, further comprising:
  receiving the signal to execute the launch procedure via a UAV rack processor; and
  ejecting the at least one altitude launchable UAV from the UAV rack via an actuator.

11. The Method of claim 8, further comprising wirelessly charging each of the altitude launchable UAVs via a wireless power system disposed in the UAV rack.

12. The Method of claim 8, further comprising:
  executing a loiter procedure by the at least one altitude launchable UAVs; and
  transmitting mission parameters to the at least one altitude launchable UAVs via a ground station.

13. The Method of claim 12, wherein the mission parameters define a kinetic intercept mission.

14. A UAV rack comprising:
  one or more UAV bays, each configured to hold an altitude launchable UAV;
  at least one processor in data communication with an antenna and a memory storing processor executable code for configuring the at least one processor to:
    receive a signal to place one of the altitude launchable UAVs in a launch mode, the launch mode defined by a drop of a predetermined distanced corresponding to an altitude of the UAV rack; and
    execute a launch procedure.

15. The UAV rack of claim 14, wherein the processor is further configured to eject the at least one altitude launchable UAV via an actuator.

16. The UAV rack of claim 14, further comprising a bay door associated with each of the one or more UAV bays.

17. The UAV rack of claim 14, further comprising a wireless power system disposed to charge each of the one or more altitude launchable UAVs.

18. The UAV rack of claim 14, further comprising one or more sensors, wherein the at least one processor is configured to:
  receive sensor data from the one or more sensors; and
  transmit the sensor data to the altitude launchable UAVs during the launch procedure.

19. The UAV rack of claim 14, wherein sensors comprise at least one weather sensor.

20. The UAV rack of claim 14, further comprising one or more attachment elements to engage an aerostat.

* * * * *